US012457459B2

(12) United States Patent
Coenen

(10) Patent No.: US 12,457,459 B2
(45) Date of Patent: Oct. 28, 2025

(54) CRYSTAL OSCILLATOR POWER REDUCTION MECHANISM

(71) Applicant: SEMICONDUCTOR COMPONENTS INDUSTRIES, LLC, Scottsdale, AZ (US)

(72) Inventor: Ivo Leonardus Coenen, Coffrane (CH)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 338 days.

(21) Appl. No.: 18/363,167

(22) Filed: Aug. 1, 2023

(65) Prior Publication Data

US 2024/0348996 A1 Oct. 17, 2024

Related U.S. Application Data

(60) Provisional application No. 63/496,302, filed on Apr. 14, 2023.

(51) Int. Cl.
*H04R 25/00* (2006.01)

(52) U.S. Cl.
CPC ....... *H04R 25/554* (2013.01); *H04R 2460/03* (2013.01)

(58) Field of Classification Search
CPC .......................... H04R 25/554; H04R 2460/03
USPC ......................................................... 381/323
See application file for complete search history.

(56) References Cited

U.S. PATENT DOCUMENTS 7,123,113 B1 10/2006 Brennan et al.
8,552,807 B2 10/2013 Ou-Yang
9,680,413 B2 6/2017 Paidimarri et al.
10,608,587 B2 3/2020 Floberg
10,693,476 B2 6/2020 Maruyama et al.
2007/0030085 A1 2/2007 Brennan et al.
2017/0294915 A1 10/2017 Huang et al.

FOREIGN PATENT DOCUMENTS

JP H0677317 U 10/1994

OTHER PUBLICATIONS

"Crystal Oscillators", http://www.stades.co.uk/XTAL%20Oscillator/XTAL%20Oscillator.html, 11 pages.
German Search Report completed Jul. 22, 2024 for German Application No. 102023128483.5, 10 pages.

*Primary Examiner* — Phylesha Dabney
(74) *Attorney, Agent, or Firm* — Dickinson Wright PLLC; Jonathan A. Schnayer

(57) ABSTRACT

Clock sources, apparatuses, and methods for operating crystal oscillators. The method includes determining a first time value indicating an amount of time needed to return a trimming value of the crystal oscillator to a predetermined value. The method also includes determining a second time value indicating an amount of time remaining until a clock signal with a predetermined frequency precision is needed. The method further includes detecting that a difference between the first time value and the second time value is greater than or equal to a predetermined step time. The method also includes incrementing a precision reduction value when the difference between the first time value and the second time value is greater than or equal to the predetermined step time. The method further includes adjusting the trimming value of the crystal oscillator based on a difference between the predetermined value and the precision reduction value.

20 Claims, 6 Drawing Sheets

CRYSTAL OSCILLATOR POWER REDUCTION MECHANISM

CROSS-REFERENCE TO RELATED APPLICATIONS

This application claims priority to and the benefit of U.S. Provisional Application Ser. No. 63/496,302 filed Apr. 14, 2023, titled "CRYSTAL OSCILLATOR POWER REDUCTION," the entire disclosure of which is hereby incorporated by reference for all purposes.

BACKGROUND

Low power consumption plays a key role in battery-operated devices, such as hearing aids. Hearing aids include a primary circuit that needs a high-frequency crystal oscillator to perform fast digital processing. The power consumption of high-frequency crystal oscillators in such battery-operated devices can be substantial and often accounts for a large portion of the total power consumption.

SUMMARY

A high-frequency crystal oscillator in a battery-operated device has a relatively high power consumption. During radio-frequency (RF) communication (for example, during Bluetooth communication), the frequency precision of the crystal oscillator needs to be very high. However, outside of RF communication, the frequency precision of the crystal oscillator can be lower. Thus, the present disclosure provides clock sources, apparatuses, and methods that, among other things, lower the frequency precision of a crystal oscillator to lower power consumption temporarily between RF communications. The present disclosure further provides clock sources, apparatuses, and methods that, among other things, step-down a trimming value provided to a crystal oscillator after a transmission event, and then step-up the trimming value back to a nominal value just in time for the next transmission event.

The present disclosure provides a method for operating a crystal oscillator. The method includes determining a first time value indicating an amount of time needed to return a trimming value of the crystal oscillator to a predetermined value. The method also includes determining a second time value indicating an amount of time remaining until a clock signal with a predetermined frequency precision is needed. The method further includes detecting that a difference between the first time value and the second time value is greater than or equal to a predetermined step time. The method also includes incrementing a precision reduction value when the difference between the first time value and the second time value is greater than or equal to the predetermined step time. The method further includes adjusting the trimming value of the crystal oscillator based on a difference between the predetermined value and the precision reduction value.

The present disclosure also provides a clock source including, in one implementation, a crystal oscillator and a controller. The crystal oscillator is configured to generate a clock signal based on a trimming value. The controller is configured to determine a first time value indicating an amount of time needed to return the trimming value to a predetermined value. The controller is also configured to determine a second time value indicating an amount of time remaining until a clock signal with a predetermined frequency precision is needed. The controller is further configured to detect that a difference between the first time value and the second time value is greater than or equal to a predetermined step time. The controller is also configured to increment a precision reduction value when the difference between the first time value and the second time value is greater than or equal to the predetermined step time. The controller is further configured to adjust the trimming value based on a difference between the predetermined value and the precision reduction value.

The present disclosure further provides an apparatus including, in one implementation, a wireless communication circuit, a crystal oscillator, and a controller. The wireless communication circuit is configured to communicate wirelessly to devices outside the apparatus. The crystal oscillator is configured to generate a clock signal based on a trimming value. The controller is configured to determine a first time value indicating an amount of time needed to return the trimming value to a predetermined value. The controller is also configured to determine a second time value indicating an amount of time remaining until a next transmission event of the wireless communication circuit. The controller is further configured to detect that a difference between the first time value and the second time value is greater than or equal to a predetermined step time. The controller is also configured to increment a precision reduction value when the difference between the first time value and the second time value is greater than or equal to the predetermined step time. The controller is further configured to adjust the trimming value based on the precision reduction value.

BRIEF DESCRIPTION OF THE DRAWINGS

For a detailed description of example implementations, reference will now be made to the accompanying drawings in which.

DEFINITIONS

Figure 1:
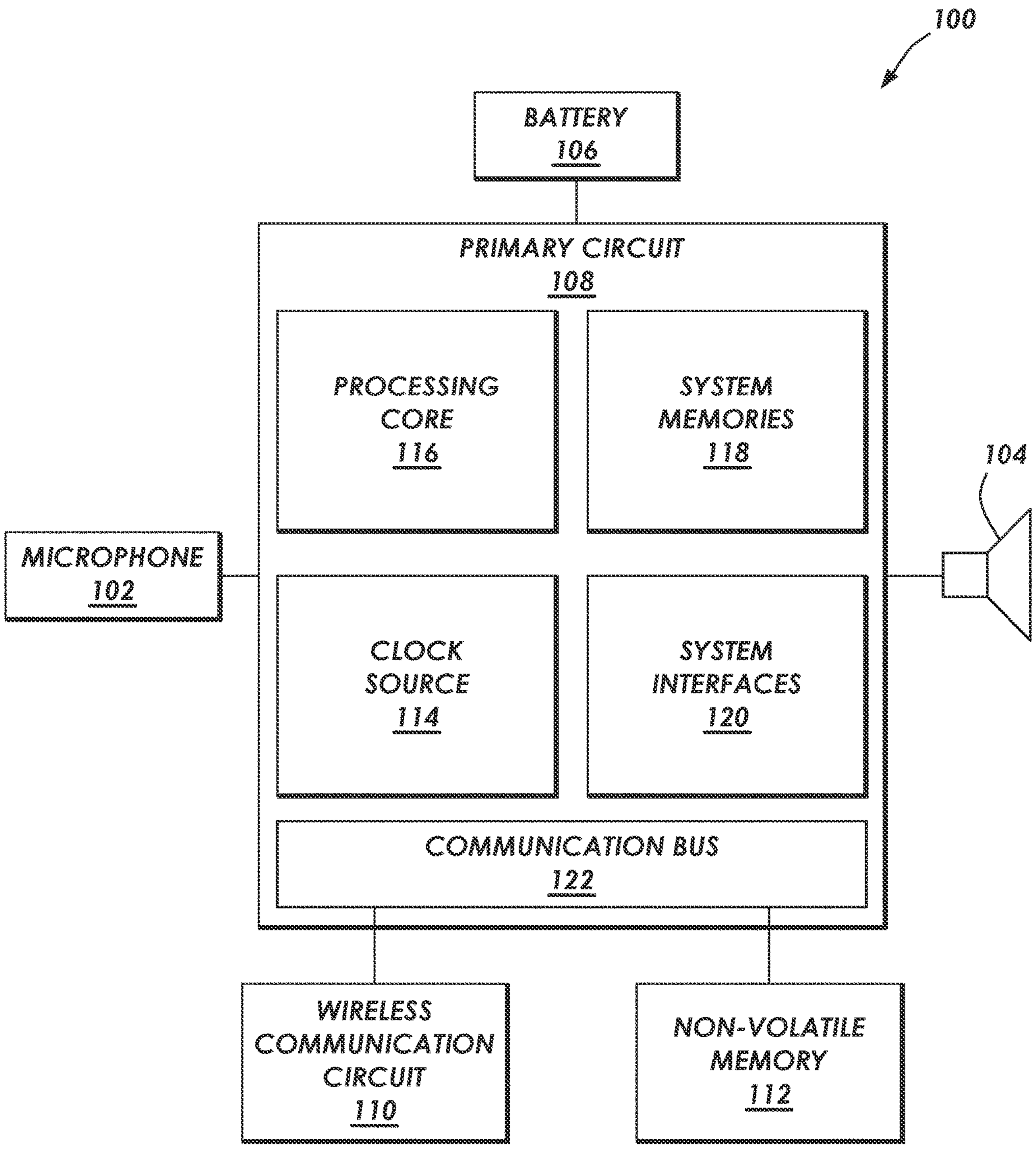
FIG. 1 is a block diagram of an example of a hearing aid in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to methods and systems of power management with adaptive clock frequency scaling. More particularly, various examples are directed to crystal oscillators and related controllers that lower frequency precision to lower power consumption temporarily between transmission events. More particularly still, various examples are directed to crystal oscillators and related controllers that step-down a trimming value provided to a crystal oscillator after a transmission event, and then step-up the trimming value back to a nominal value just in time for the next transmission event. The specification now turns to an example system to orient the reader.

FIG. 1 is a block diagram of an example of a hearing aid 100 in accordance with some implementations of the present disclosure. The hearing aid 100 illustrated in FIG. 1 includes a microphone 102, a speaker 104, a battery 106, a primary circuit 108, a wireless communication circuit 110, and a non-volatile memory 112. In some implementations, the hearing aid 100 may include more components, fewer components, or different components than the ones illustrated in FIG. 1.

The microphone 102, the speaker 104, and the battery 106 are electrically coupled to the primary circuit 108. During operation, the hearing aid 100 receives sound through the microphone 102, converts the sound waves to electrical signals, and forwards the electrical signals to be processed by the primary circuit 108. The processed signals are converted to sound waves by the speaker 104 and sent to an ear.

The power for the hearing aid 100 illustrated in FIG. 1 is provided by the battery 106. In some implementations, a single battery is sufficient. In alternate implementations, multiple batteries may be used (for example, in series or in parallel). A variety of types of batteries can be used in the hearing aid 100, dependent on the type of the hearing aid 100. In some implementations, the battery 106 provides a supply voltage of less than 2 Volts. In some implementations, the battery 106 is rechargeable. In alternate implementations, the battery 106 is disposable.

The primary circuit 108 illustrated in FIG. 1 includes a clock source 114, a processing core 116, system memories 118, system interfaces 120, and a communication bus 122. In some implementations, the primary circuit 108 may include more components, fewer components, or different components than the ones illustrated in FIG. 1. Though not shown in FIG. 1, the clock source 114, the processing core 116, the system memories 118, and the system interfaces 120 are coupled to the communication bus 122. Also, though not shown in FIG. 1, the clock source 114 is coupled to all the circuits on the primary circuit 108, and provides a clock signal. As will be described in more detail below, the clock source 114 includes circuitry configured to adjust the power consumed by the hearing aid 100 by adaptively scaling the frequency of a clock signal provided to the various logic circuits of the primary circuit 108. For example, the frequency precision of the clock signal provided to the logic circuits of the primary circuit 108 can be reduced when a clock signal with high frequency precision is not needed.

The processing core 116 carries out signal processing functionality, including a variety of Digital Signal Processing (DSP) algorithms as well as multiple types of wireless communication protocols. In some implementations, the processing core 116 includes at least one low-power DSP core, and a Reduced Instruction Set Computer (RISC) core. The processing core 116 may further include a filter engine core, and a plurality of hardware accelerators, which may be configurable. In some implementations, the processing core 116 may include a neural network hardware accelerator to implement a neural network functionality, including fetching a plurality of weights from a weights memory and carrying out a plurality of multiply-accumulate (MAC) operations that operate in parallel. The MAC operations may repetitively multiply an input value and a weight selected from the plurality of weights to accumulate the result of the multiplication to a sum of products representing a value corresponding to a neuron in the neural network.

The system interfaces 120 are configured to couple to additional external devices, such as an Electrically Erasable Programmable Read Only Memory (EEPROM), volume control circuitry, a fitting connector, push-button switches, and sensors. The system interfaces 120 may take any suitable form, such as a serial peripheral interface (SPI), Dual SPI (DSPI), a Quad SPI (QSPI), an I2C interface, an I3C interface, an interface for Pulse Coded Modulation (PCM) signals, a Universal Asynchronous Receiver/Transmitter (UART) circuit, a General Purpose Input/Output (GPIO) pin, an embedded MultiMediaCard (eMMC), and a Low-Speed A/D (LSAD) converter. SPI, DSPI, and QSPI are serial primary-secondary-based communication interfaces that are synchronous and full duplex, and may be three-wire or four-wire based. On the other hand, I2C and I3C are serial protocols based on two-wire interfaces, configured to support multi-master features. An example PCM interface may be used to stream audio signal data into and out of the primary circuit 108. An example UART may include a logic circuit to transmit and receive asynchronous serial communication comprising data with a configurable format and a configurable speed. An example GPIO is a digital signal pin whose functionality, specifically input or output, may be determined during run-time. In some implementations, the GPIO pins may connect to external digital inputs such as push-buttons, or digital outputs such as a control or trigger of an external companion chip. The example eMMC may include an interface, a flash memory, and a flash memory controller, to provide an embedded non-volatile memory system. The example LSAD may provide analog-to-digital conversion of electrical signals for data processing purposes, and may include internal supply and ground inputs. In some implementations, the communication bus 122 may be part of the system interfaces 120.

The wireless communication circuit 110 illustrated in FIG. 1 is coupled to the primary circuit 108 by way of the communication bus 122. In alternate implementations, the wireless communication circuit 110 may be part of the primary circuit 108. In some implementations, the wireless communication circuit 110 includes a multi-protocol system-on-a-chip (SoC) to implement a variety of wireless communication related schemes. For example, the wireless communication circuit 110 may include an SoC to implement Bluetooth Low Energy (BLE), a plurality of 2.4 GHz ultra-low-power wireless applications, or a combination thereof.

The non-volatile memory 112 illustrated in FIG. 1 is coupled to the primary circuit 108 by way of the communication bus 122. In alternate implementations, the non-volatile memory 112 is coupled to the primary circuit 108 by way of a separate communication bus (not specifically shown). The non-volatile memory 112 may include any suitable non-volatile member, such as an EEPROM, a flash memory, a mass storage device, or combinations thereof. The specification now turns to a more detailed description of the clock source 114.

Figure 2:
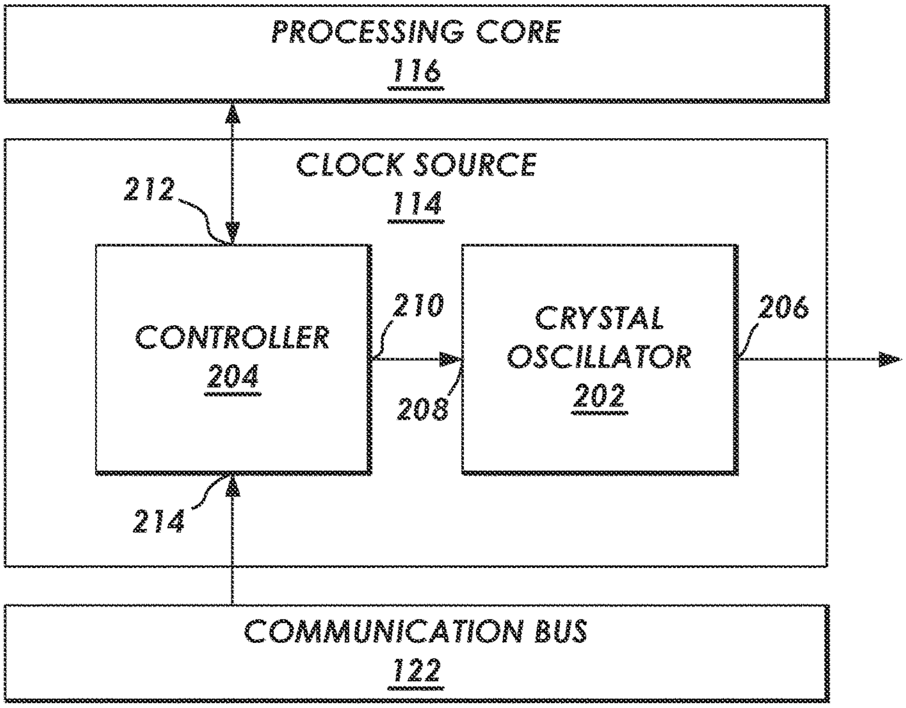
FIG. 2 is a block diagram of an example of a clock source included in the hearing aid of FIG. 1 in accordance with some implementations.

FIG. 2 is an example of a block diagram of the clock source 114 in accordance with some implementations of the present disclosure. The clock source 114 illustrated in FIG. 2 includes a crystal oscillator 202 and a controller 204. In some implementations, the clock source 114 may include more components, fewer components, or different components than the ones illustrated in FIG. 2. For example, aside from the connections described below, additional input and output connections will be present (for example, power connections, reference voltage connections, and ground connections), but those additional input and output connections are not shown so as not to unduly complicate the figure.

The crystal oscillator 202 is configured to generate a clock signal. The crystal oscillator 202 illustrated in FIG. 2 includes a clock output 206 coupled to and providing the clock signal to all the logic circuits of the primary circuit 108. The crystal oscillator 202 illustrated in FIG. 2 also includes a clock control input 208 for receiving a trimming value. As will be described in more detail below, the crystal oscillator 202 is configured adjust the frequency precision of the clock signal based on the trimming value.

The controller 204 is configured to generate the trimming value. The controller 204 illustrated in FIG. 2 includes a clock control output 210 coupled to the clock control input 208 to provide the trimming value to the crystal oscillator 202. As will be described in more detail below, the controller 204 is configured to adjust the trimming value to reduce the power consumption and consequently change the frequency of the clock signal generated by the crystal oscillator 202 when the frequency precision of the clock signal can be reduced (for example, from 20 ppm (parts per million) to 100 ppm). The controller 204 illustrated in FIG. 2 also includes a processing input 212 coupled to the processing core 116. The controller 204 illustrated in FIG. 2 further includes a communication input 214 coupled to the communication bus 122. As will be described in more detail below, in some implementations, the controller 204 is configured to determine when a precise clock signal is needed based on signals from the processing core 116, the communication bus 122, or both. The specification now turns to a more detailed description of the crystal oscillator 202.

Figure 3:
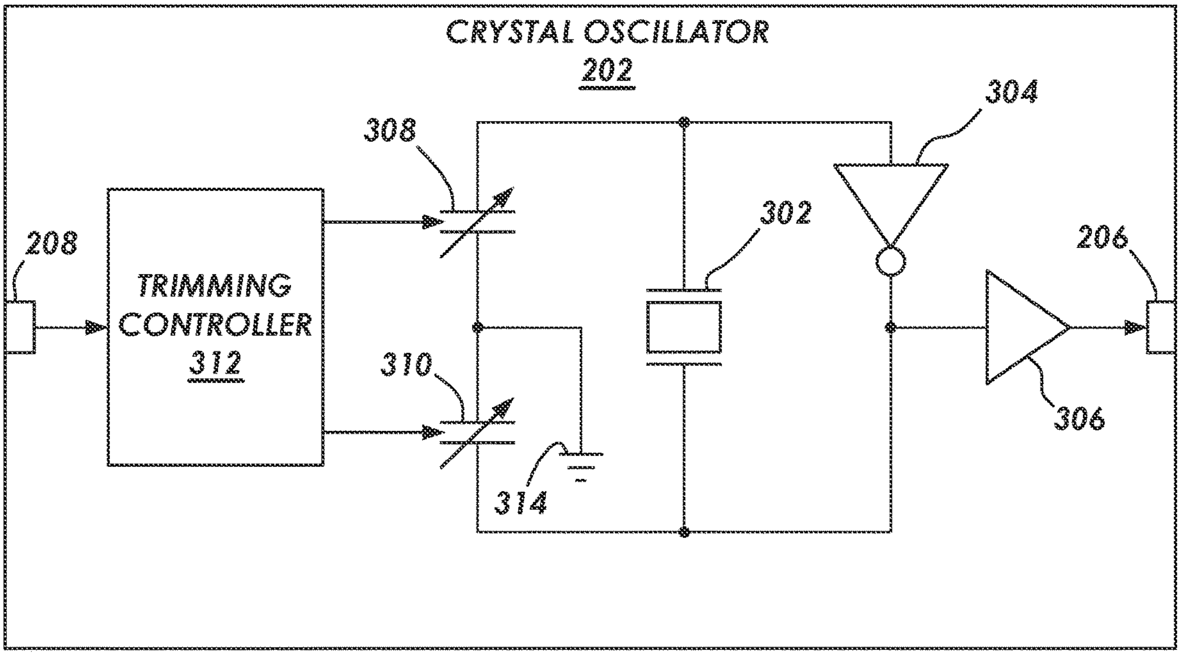
FIG. 3 is a partial schematic and partial block diagram of a crystal oscillator included in the clock source of FIG. 2 in accordance with some implementations.

FIG. 3 is an example of a partial schematic and partial block diagram of the crystal oscillator 202 in accordance with some implementations of the present disclosure. The crystal oscillator 202 illustrated in FIG. 3 includes a crystal 302, an inverting amplifier 304, a buffer 306, a first adjustable capacitor 308, a second adjustable capacitor 310, and a trimming controller 312. In FIG. 3, the first adjustable capacitor 308 and the second adjustable capacitor 310 are coupled in a parallel configuration between the crystal 302 and a reference terminal 314 (for example, a ground terminal). In other implementations, the first adjustable capacitor 308 and the second adjustable capacitor 310 may be coupled in a series configuration. In some implementations, the crystal oscillator 202 may include more components, fewer components, or different components than the ones illustrated in FIG. 3. For example, power connections, reference voltage connections, and additional ground connections will be present, but those additional connections are not shown so as not to unduly complicate the figure.

The crystal 302 is coupled between the output and the input of the inverting amplifier 304. The inverting amplifier 304 is configured to apply an alternating voltage across the crystal 302 which causes the crystal 302 to vibrate at its resonant frequency. The vibrations cause the alternating voltage to form a continuous sine wave with a frequency that is substantially equal to the resonant frequency of the crystal 302. The buffer 306 is configured to generate a clock signal based on the sine wave. The clock signal is an electronic logic signal which oscillates between a high-state and a low-state at a frequency. The output of the buffer 306 is coupled to the clock output 206 to provide the clock signal thereto.

The first adjustable capacitor 308 and the second adjustable capacitor 310 provide an adjustable load capacitance across the crystal 302. The trimming controller 312 is coupled to the clock control input 208 to receive the trimming value therefrom. The trimming controller 312 is configured to adjust the capacitances of the first adjustable capacitor 308 and the second adjustable capacitor 310 based on the trimming value. For example, the trimming controller 312 is configured to increase the capacitances of the first adjustable capacitor 308 and the second adjustable capacitor 310 when the trimming value increases. Further, the trimming controller 312 is configured to decrease the capacitances of the first adjustable capacitor 308 and the second adjustable capacitor 310 when the trimming value decreases. The crystal 302 is designed to have a target resonant frequency with a specific load capacitance added to the crystal 302. The actual resonant frequency of the crystal 302 is close to the target resonant frequency when the first adjustable capacitor 308 and the second adjustable capacitor 310 provide a load capacitance across the crystal 302 that is close to the specific load capacitance for the crystal 302. The frequency stability of the crystal oscillator 202 is determined based in part on the variation between the load capacitance provided by the first adjustable capacitor 308 and the second adjustable capacitor 310 and the specific load capacitance of the crystal 302. For example, when the crystal oscillator 202 is configured to generate an output frequency of 48 Megahertz with the load capacitance specified by the crystal 302 to provide a frequency precision of 20 ppm, the output frequency of the crystal oscillator 202 will vary by at most 960 Hertz. Further, when the crystal oscillator 202 is configured to generate an output frequency of 48 Megahertz and the load capacitance is less than specified by the crystal 302, then the frequency precision will be reduced, for example, to 100 ppm, so that the output frequency of the crystal oscillator 202 will vary by at most 480 Hertz.

The trimming value may be set to a specific nominal value (referred to herein as a "predetermined value") at which the frequency stability of the crystal oscillator 202 complies with the clock signal requirements of a component included in the hearing aid 100. For example, the trimming value may be set to a nominal value at which the frequency stability of the crystal oscillator 202 complies with the clock signal requirements of the wireless communication circuit 110. As a more specific example, when the wireless communication circuit 110 requires a clock signal with a frequency precision of 20 PPM in order to transmit data packets and a trimming value of 170 provides a frequency precision of 20 PPM, the trimming value may be set to a nominal value of 170.

Lowering the capacitances of the first adjustable capacitor 308 and the second adjustable capacitor 310, by reducing the trimming value, significantly reduces the power consumption of the crystal oscillator 202. Lowering the capacitances of the first adjustable capacitor 308 and the second adjustable capacitor 310, again by reducing the trimming value, also slightly increases the frequency of the crystal oscillator 202, and thus reduces the frequency precision. However, only some operations of the hearing aid 100 may need a clock signal with high frequency precision. For example, while a clock signal with a frequency precision of 20 PPM may be needed while the wireless communication circuit 110 transmits data packets, a clock signal with a lower frequency precision (for example, 100 PPM) may be used between transmissions of data packets. Thus, between transmissions of data packets by the wireless communication circuit 110, the trimming value can be decreased to reduce power consumption.

As described above, the trimming value is generated by the controller 204. When a clock signal with high frequency precision is not needed, the controller 204 decreases the trimming value from its nominal value. To avoid glitches on the generated clock signal, the controller 204 is configured to decrease the trimming value in small steps. For example, the controller 204 may decrease the trimming value by one unit every three microseconds until the trimming value reaches a predetermined minimum value. Subsequently, the controller 204 increases the trimming value to its nominal value just in time for when a clock signal with high frequency precision is needed again. Again, to avoid glitches on the generated clock signal, the controller 204 is configured to increase the trimming value in small steps. For example, the controller 204 may increase the trimming value by one unit every three microseconds until the trimming value returns to the nominal value.

The controller 204 is configured to use a precision reduction value to keep track of how many steps are needed to return the trimming value to its nominal value. For example, the controller 204 may increment the precision reduction value when the trimming value is reduced by one unit, and decrement the precision reduction value when the trimming value is increased by one unit. In some implementations, the controller 204 increments the precision reduction value by increasing the precision reduction value by one unit and decrements the precision reduction value by decreasing the precision reduction value by one unit. In alternate implementations, the controller 204 increments the precision reduction value by decreasing the precision reduction value by one unit and decrements the precision reduction value by increasing the precision reduction value by one unit. The controller 204 is configured to adjust the trimming value based on the precision reduction value. In some implementations, the controller 204 may determine the trimming signal by subtracting the precision reduction value from the nominal value. Thus, when the precision reduction value is equal to zero, the controller 204 may set the trimming value to its nominal value. As described in more detail below, the controller 204 is further configured to increment and decrement the precision reduction value based on how much time is remaining until a clock signal with high frequency precision is needed again.

Figure 4:
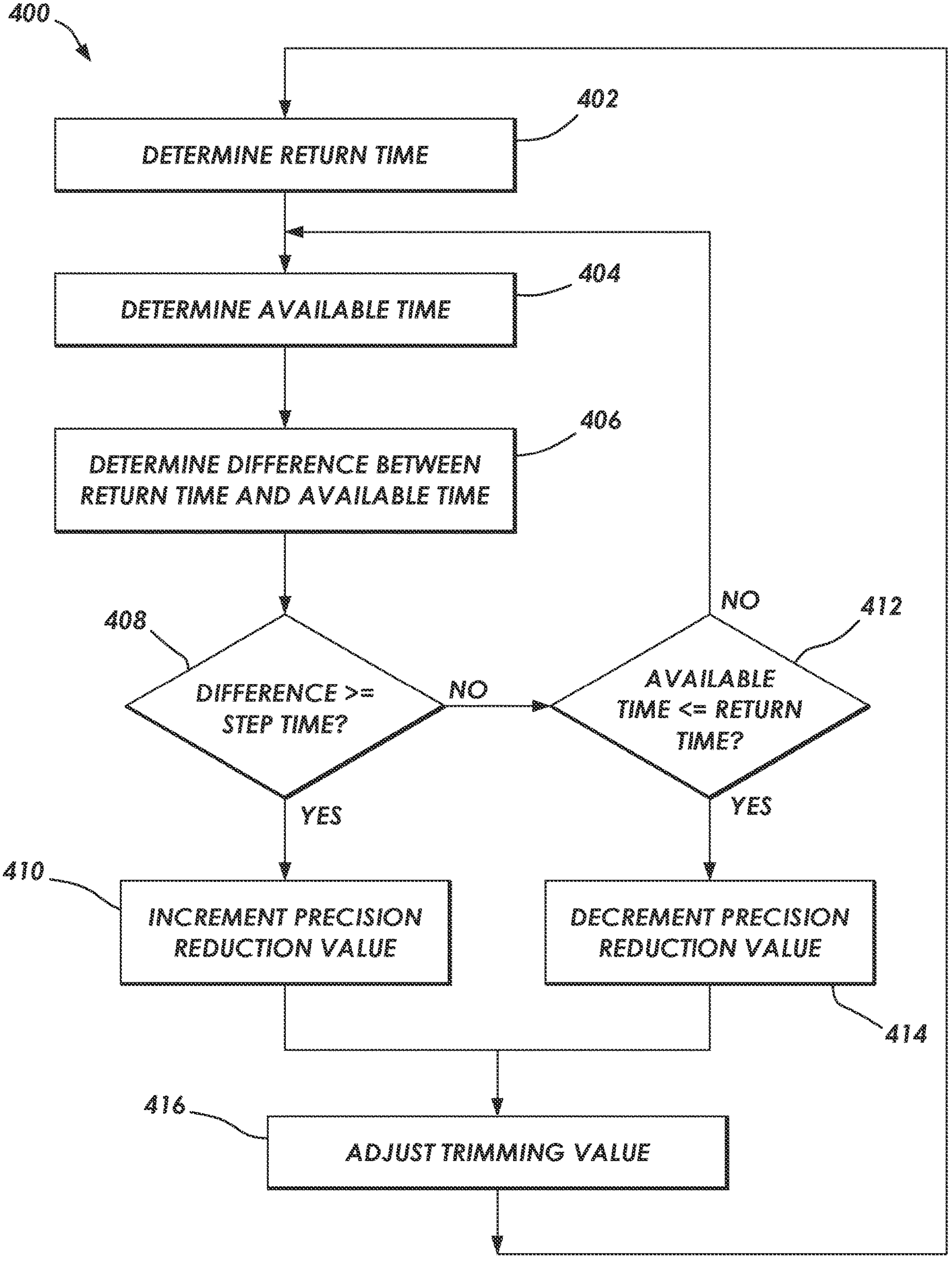
FIG. 4 is a flow diagram of an example of a method for operating a crystal oscillator in accordance with some implementations.

FIG. 4 is a flow diagram of an example of a method 400 for operating the crystal oscillator 202 in accordance with some implementations. At block 402, the controller 204 determines a return time. The return time (an example of a "first time value") is the amount of time needed to return the trimming value to its nominal value (an example of a "predetermined value"). In some implementations, the controller 204 may determine the return time based on the precision reduction value and the step time. For example, the controller 204 may determine a return time of 30 microseconds when the precision reduction value is equal to 10 and the step time is 3 microseconds. In some implementations, the step time is 1 microsecond. The trimming value may need to return to its nominal value slightly before a clock signal with high frequency precision is needed in order to allow the clock signal to stabilize. This stabilization time may be predetermined for the system. In some implementations, the controller 204 may determine the return time based on the predetermined stabilization time. For example, the controller 204 may add the predetermined stabilization time to the product of the precision reduction value and the step time.

At block 404, the controller 204 determines an available time. The available time (an example of a "second time value") is the amount of time remaining until a precise clock signal is needed (i.e., a clock signal with high frequency precision). For example, when a precise clock signal is needed for an upcoming transmission event of the wireless communication circuit 110, in some implementations, the controller 204 internally keeps count of the time remaining until the transmission event. Alternatively, or in addition, the controller 204 may receive a signal value from the wireless communication circuit 110 indicating the amount of time remaining until the next transmission event.

At block 406, the controller 204 determines a difference between the return time and the available time. For example, the controller 204 may subtract the available time from the return time. At block 408, the controller 204 determines whether the difference between the return time and the available time is greater than or equal to the step time. When the difference between the return time and the available time is greater than or equal to the step time, the precision reduction value is incremented at block 410. For example, when the step time is 3 microseconds and the difference between the return time and the available time is 12 microseconds, the controller 204 may increase the precision reduction value by one. Alternatively, when the difference between the return time and the available time is less than the step time, the controller 204 determines whether the available time is less than or equal to the return time at block 412. When the available time is less than or equal to the return time, the precision reduction value is decremented at block 414. For example, when the available time and the return time are both 100 microseconds, the controller 204 may decrease the precision reduction value by one. Alternatively, when the available time is greater than the return time, the method 400 returns to block 404 to determine the available time again. For example, when the available time is 402 microseconds and the return time is 400 microseconds, the precision reduction value is not changed and the method 400 returns to block 404 to determine the available time again. In some implementations, the method 400 waits before returning to block 404. For example, the method 400 may wait for the period of the step time before returning to block 404.

After the precision reduction value is incremented at block 410 or decremented at block 414, the trimming value is adjusted at block 416. In some implementations, the controller 204 may determine the trimming signal by subtracting the precision reduction value from the nominal value. After the trimming value is adjusted, the method 400 returns to block 402 to determine the return time again. In some implementations, the method 400 waits before returning to block 402. For example, the method 400 may wait for the period of the step time before returning to block 402.

Figure 5:
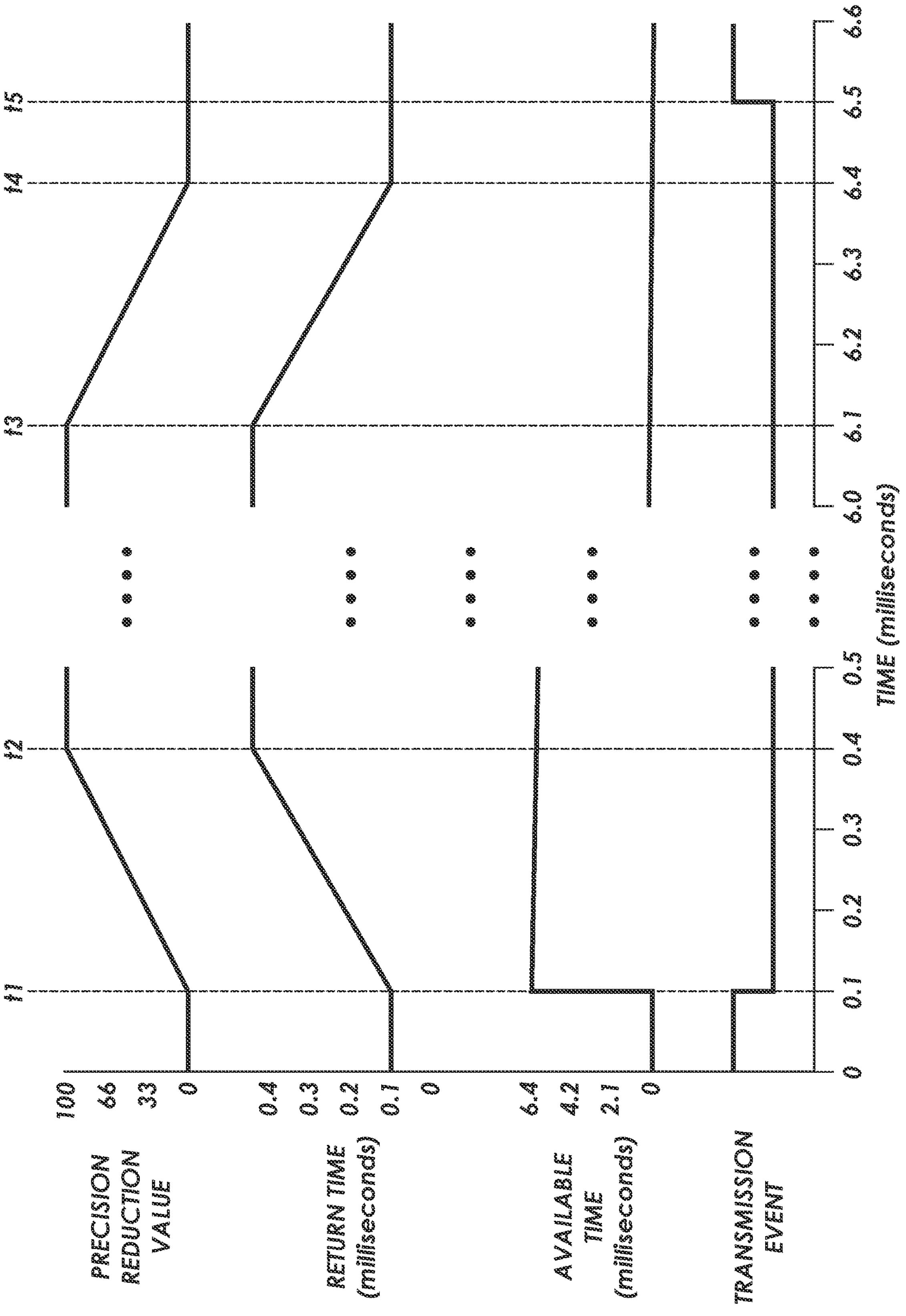
FIG. 5 is a timing diagram of an example operation of a clock source between transmission events in accordance with some implementations.

FIG. 5 is a timing diagram of an example operation of the clock source 114 between transmission events. At time t1, a transmission event of the wireless communication circuit 110 ends. Also, at time t1, the clock signal generated by the crystal oscillator 202 has a high frequency precision because the precision reduction value is equal to zero. About 3 microseconds after time t1, the available time increases to 6.4 milliseconds and slowly decreases afterward. Further, because the difference between the available time and the return time is greater than the step time of 3 microseconds, the precision reduction value starts stepping up every 3 microseconds until the precision reduction value reaches a maximum value of 100 at time t2. As the precision reduction value steps up between time t1 and time t2, the return time increases from a stabilization time needed before the next transmission event. Also, as the precision reduction value steps up between time t1 and time t2, the frequency precision of the clock signal generated by the crystal oscillator 202 decreases.

Between time t2 and time t3, the precision reduction value remains constant because the precision reduction value is at a maximum value and the available time is greater than the return time. Further, between time t2 and time t3, the return time remains constant because the precision reduction value is constant. In addition, the frequency precision of the clock signal generated by the crystal oscillator 202 remains constant because the precision reduction value is constant.

At time t3, the available time is equal to the return time. Thus, at time t3, the precision reduction value starts stepping down every 3 microseconds until the precision reduction value reaches zero at time t4. As the precision reduction value steps down between time t3 and time t4, the return time decreases down to the stabilization time needed for the next transmission event. Also, as the precision reduction value steps down between time t3 and time t4, the frequency precision of the clock signal generated by the crystal oscillator 202 increases.

Between time t4 and time t5, the precision reduction value remains constant so that the clock signal may stabilize before the next transmission event. At time t5, the next transmission event of the wireless communication circuit 110 starts.

Figure 6:
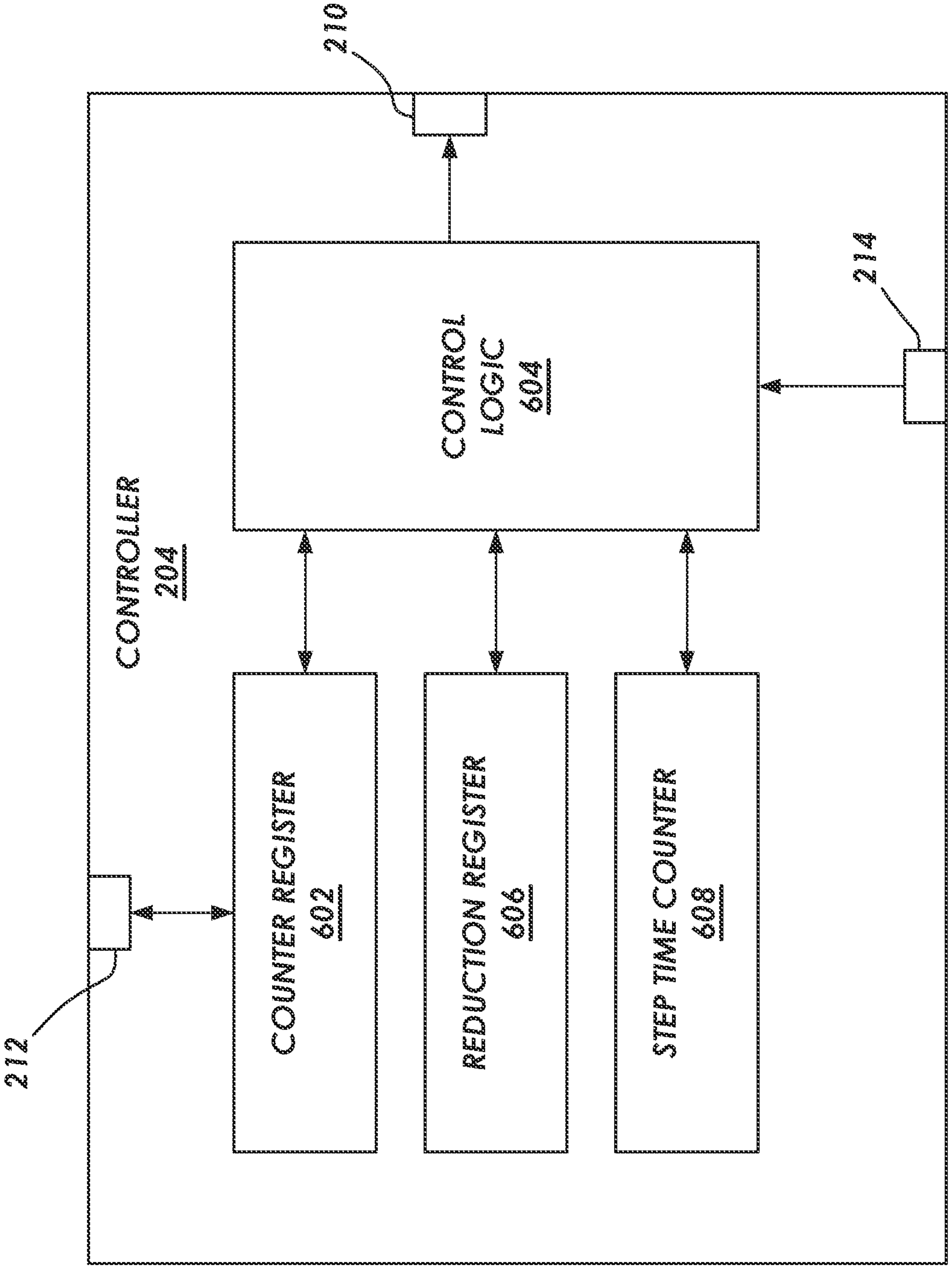
FIG. 6 is a block diagram of an example of a controller included in the clock source of FIG. 2 in accordance with some implementations.

In some implementations, the available time and the precision reduction value are stored in registers in the controller 204. FIG. 6 is an example of a block diagram of the controller 204 in accordance with some implementations of the present disclosure. The controller 204 illustrated in FIG. 6 includes a counter register 602, a control logic 604, a reduction register 606, and a step time counter 608. In some implementations, the controller 204 may include more components, fewer components, or different components than the ones illustrated in FIG. 6.

The counter register 602 is coupled to the processing input 212 (which, as described above in relation to FIG. 2, is coupled to the processing core 116). In some implementations, the value of the counter register 602 is set to the amount of time remaining until a next transmission event of the wireless communication circuit 110. For example, the processing core 116 may send the amount of time remaining to the counter register 602 for storage therein. The counter register 602 is also coupled to the control logic 604. In some implementations, the control logic 604 may determine the available time as the value of the counter register 602. Alternatively, or in addition, the control logic 604 may determine the available time based on a signal value received from the wireless communication circuit 110. For example, the control logic 604 is coupled to the communication input 214 (which, as described above in relation to FIG. 2, is coupled to the wireless communication circuit 110 via the communication bus 122). The control logic 604 may receive a signal value from the wireless communication circuit 110 indicating an amount of time remaining until a next transmission event of the wireless communication circuit 110. In some implementations, the control logic 604 may determine the available time based on the value of the counter register 602 and the signal value received from the wireless communication circuit 110. For example, the control logic 604 may select the smaller of the value of the counter register 602 and the signal value received from the wireless communication circuit 110 as the available time.

The control logic 604 is also coupled to the reduction register 606 to store the precision reduction value therein. The control logic 604 is further coupled to the clock control output 210 to provide the trimming value to the crystal oscillator 202. The control logic 604 is configured to determine the available time and the return time, as described above. The control logic 604 is also configured to step-up and step-down the precision reduction value based on the available time and the return time, as described above. The control logic 604 is further configured to generate the trimming value based on the precision reduction value, as described above.

The step time counter 608 is configured to count the time for each step and generate time indication pulses. For example, when the step time is 1 microsecond, the step time counter 608 may generate a time indication pulse every 1 microsecond. The control logic 604 is coupled to the step time counter 608 to receive time indication pulses as input. The control logic 604 may increase or decrease the value of the counter register 602 using the time indication pulses.

Figure 7:
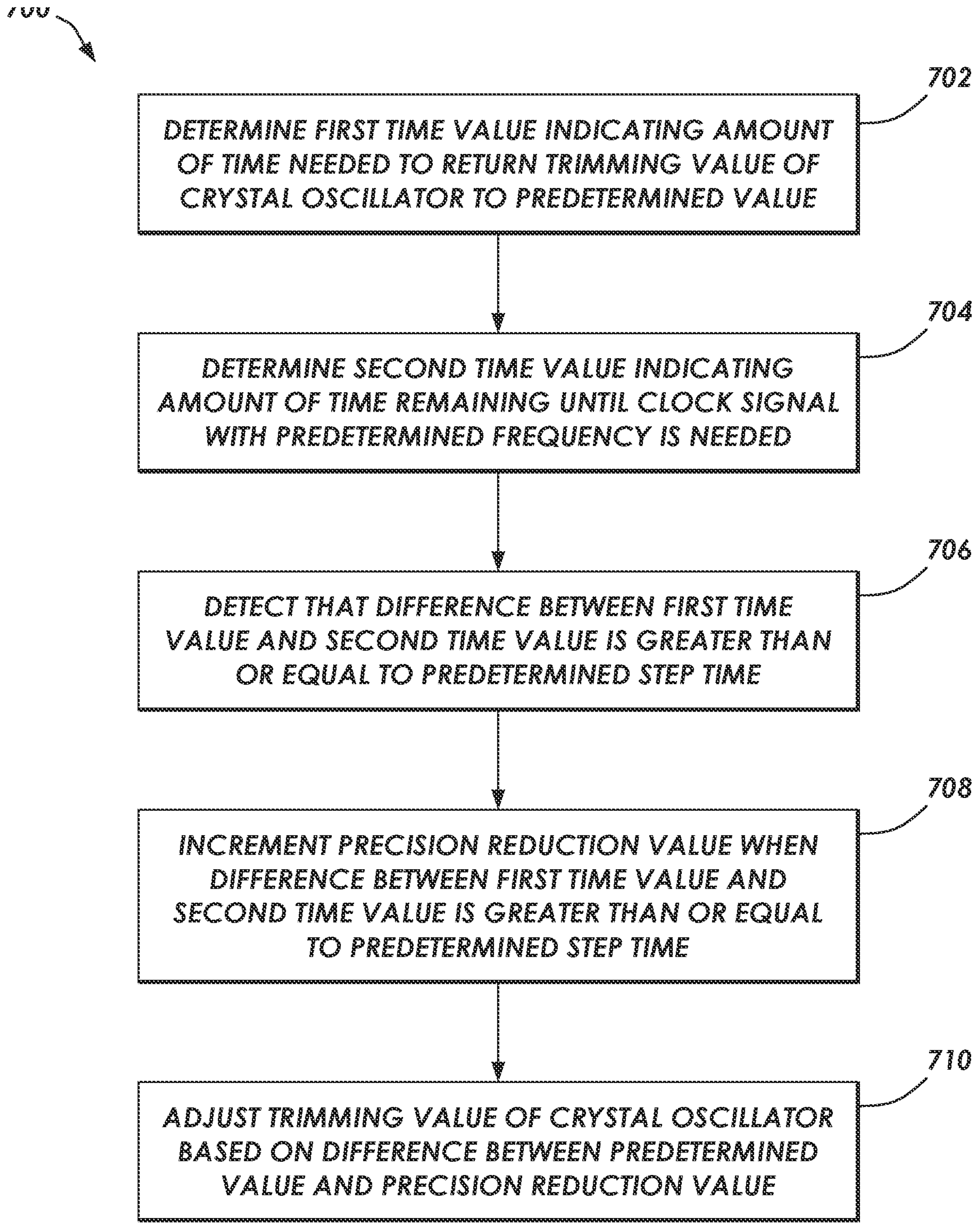
FIG. 7 is a flow diagram of an example of a method for operating a crystal oscillator in accordance with some implementations.

FIG. 7 is a flow diagram of an example of a method 700 for operating the crystal oscillator 202 in accordance with some implementations. At block 702, the controller 204 determines a first time value indicating an amount of time needed to return the trimming value of the crystal oscillator 202 to a predetermined value. For example, the controller 204 may determine the return time needed to return the trimming value to its nominal value. At block 704, the controller 204 determines a second time value indicating an amount of time remaining until a clock signal with a predetermined frequency precision is needed. For example, the controller 204 may determine an available time based on the value of the counter register 602, a signal value received from the wireless communication circuit 110, or a combination thereof. At block 706, the controller 204 detects that a difference between the first time value and the second time value is greater than or equal to a predetermined step time. For example, the controller 204 may detect that the difference between the return time and the available time is greater than or equal to the step time. At block 708, the controller 204 increments the precision reduction value when the difference between the first time value and the second time value is greater than or equal to the predetermined step time. For example, the controller 204 may increase the precision reduction value by one when the difference between the return time and the available time is greater than or equal to the step time. At block 710, the controller 204 adjusts the trimming value of the crystal oscillator 202 based on a difference between the predetermined value and the precision reduction value. For example, the controller 204 may set the trimming value equal to the difference between its nominal value and the precision reduction value.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A method for operating a crystal oscillator, the method comprising:
- determining a first time value indicating an amount of time needed to return a trimming value of the crystal oscillator to a predetermined value;
- determining a second time value indicating an amount of time remaining until a clock signal with a predetermined frequency precision is needed;
- detecting that a difference between the first time value and the second time value is greater than or equal to a predetermined step time;
- incrementing a precision reduction value when the difference between the first time value and the second time value is greater than or equal to the predetermined step time; and
- adjusting the trimming value of the crystal oscillator based on a difference between the predetermined value and the precision reduction value.

2. The method of claim 1, further comprising:
- detecting the second time value is less than or equal to the first time value; and
- decrementing the precision reduction value when the second time value is less than or equal to the first time value.

3. The method of claim 1, wherein determining the first time value further includes determining the first time value based on the precision reduction value and the predetermined step time.

4. The method of claim 3, wherein determining the first time value further includes determining the first time value based on a predetermined stabilization time.

5. The method of claim 1, wherein the method further includes setting a value of a counter register to an amount of time remaining until a next transmission event of a wireless communication circuit, and wherein determining the second time value further includes determining the second time value as the value of the counter register.

6. The method of claim 1, wherein the method further includes receiving, from a wireless communication circuit, a signal value indicating an amount of time remaining until a next transmission event of the wireless communication circuit, and wherein determining the second time value further includes determining the second time value as the signal value.

7. A clock source, comprising:
- a crystal oscillator configured to generate a clock signal based on a trimming value; and
- a controller configured to:
  - determine a first time value indicating an amount of time needed to return the trimming value to a predetermined value,
  - determine a second time value indicating an amount of time remaining until a clock signal with a predetermined frequency precision is needed,
  - detect that a difference between the first time value and the second time value is greater than or equal to a predetermined step time,
  - increment a precision reduction value when the difference between the first time value and the second time value is greater than or equal to the predetermined step time, and
  - adjust the trimming value based on a difference between the predetermined value and the precision reduction value.

8. The clock source of claim 7, wherein the controller is further configured to:
- detect the second time value is less than or equal to the first time value, and
- decrement the precision reduction value when the second time value is less than or equal to the first time value.

9. The clock source of claim 7, wherein, to determine the first time value, the controller is further configured to determine the first time value based on the precision reduction value and the predetermined step time.

10. The clock source of claim 7, wherein the crystal oscillator includes a capacitor, wherein the crystal oscillator is further configured to set a capacitance of the capacitor based on the trimming value.

11. The clock source of claim 7, wherein the controller includes a counter register, wherein the controller is further configured to set a value of the counter register to an amount of time remaining until a next transmission event of a wireless communication circuit, and wherein, to determine the second time value, the controller is further configured to determine the second time value as the value of the counter register.

12. The clock source of claim 7, wherein the controller is further configured to receive, from a wireless communication circuit, a signal value indicating an amount of time remaining until a next transmission event of the wireless communication circuit, and wherein, to determine the second time value, the controller is further configured to determine the second time value as the signal value.

13. The clock source of claim 7, wherein the controller includes a reduction register configured to store the precision reduction value.

14. An apparatus, comprising:

a wireless communication circuit configured to communicate wirelessly to devices outside the apparatus;

a crystal oscillator configured to generate a clock signal based on a trimming value; and a controller configured to:

determine a first time value indicating an amount of time needed to return the trimming value to a predetermined value, determine a second time value indicating an amount of time remaining until a next transmission event of the wireless communication circuit, detect that a difference between the first time value and the second time value is greater than or equal to a predetermined step time, increment a precision reduction value when the difference between the first time value and the second time value is greater than or equal to the predetermined step time, and adjust the trimming value based on the precision reduction value.

15. The apparatus of claim 14, wherein the apparatus is a hearing aid, and wherein the apparatus further comprises:

a microphone;

a speaker; and a battery.

16. The apparatus of claim 14, wherein, to determine the first time value, the controller is further configured to determine the first time value based on the precision reduction value and the predetermined step time.

17. The apparatus of claim 14, wherein the next transmission event comprises a transmission of audio data.

18. The apparatus of claim 14, wherein the controller is further configured to set a value of a counter register to an amount of time remaining until the next transmission event of the wireless communication circuit, and wherein, to determine the second time value, the controller is further configured to determine the second time value as the value of the counter register.

19. The apparatus of claim 14, wherein the wireless communication circuit is further configured to generate a signal value indicating the amount of time remaining until the next transmission event of the wireless communication circuit, and wherein, to determine the second time value, the controller is further configured to determine the second time value as the signal value.

20. The apparatus of claim 14, wherein the controller includes a reduction register configured to store the precision reduction value.

* * * * *